March 6, 1934.   J. PERSOONS ET AL   1,949,875
PULSATOR FOR MILKING MACHINES
Filed Feb. 18, 1932
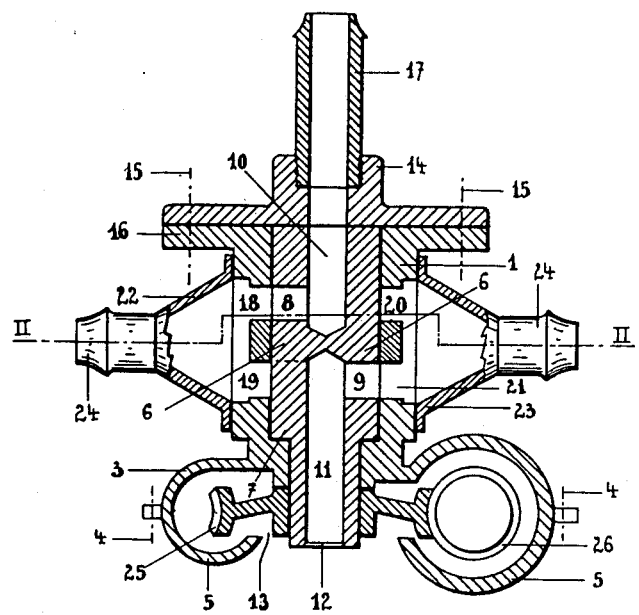
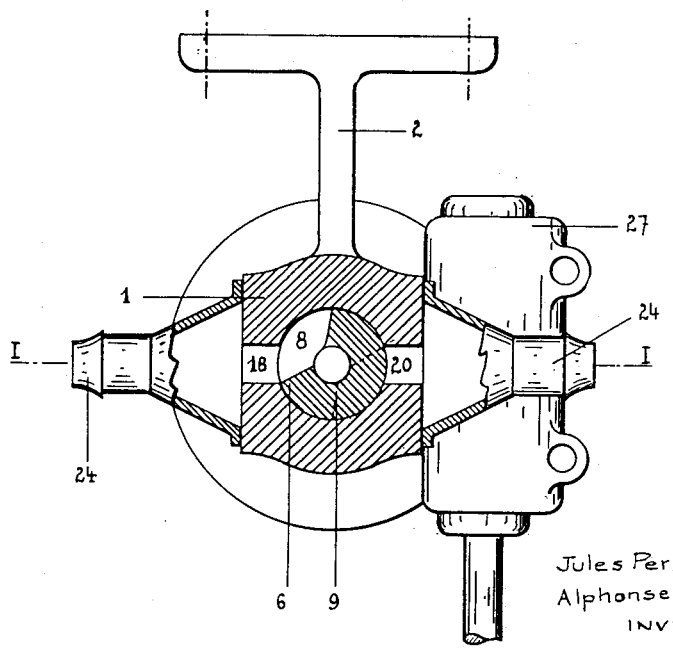
Jules Persoons
Alphonse Persoons
INVENTORS
their ATTY Patented Mar. 6, 1934

1,949,875

UNITED STATES PATENT OFFICE 1,949,875

PULSATOR FOR MILKING MACHINES

Jules Persoons and Alphonse Persoons, Thildonck, Belgium

Application February 18, 1932, Serial No. 593,701
In Belgium February 20, 1931

4 Claims. (Cl. 31—61)

Our invention relates to a pulsator for milking machines of the type utilizing a rotating valve whereby the pipes to which the milking apparatus are connected are put alternately into communication with a pipe in which a constant vacuum is maintained in order to actuate the milking apparatus, and with the atmosphere in order to stop the vacuum action and to thus produce successive pulsations in the milking apparatus.

An apparatus of this type having a rotating valve and having been used heretofore, generally requires the use of a valve provided with numerous apertures in order to establish the various communications necessary, particularly when the pulsator is intended to cooperate with two pipes, each thereof being connected with a certain number of milking devices.

A disadvantage found in most pulsators is that they produce an all too sudden action of the vacuum or of the atmospheric pressure, as indeed the period during which the apertures are opened is insufficient to secure a progressive and sufficiently long action for the regular working of the milking apparatus.

The pulsator forming the subject matter of the present invention has for its object to avoid these disadvantages.

With this object in view, the present invention is essentially characterized by the special arrangements and combinations of parts fully described in the following specification, set forth in the appended claims and illustratively exemplified in the accompanying drawing, in which, Figure 1 is a substantially longitudinal sectional view of the pulsator taken on lines I—I of Figure 2.

Figure 2 is a substantially transverse sectional view taken on lines II—II of Figure 1.

Referring to the drawing, the pulsator comprises a body portion 1 rigidly connected to a supporting member 2. The body 1 forms at its lower portion one half 3 of an annular casing, the other half 5 thereof being connected to the first half by means of bolts 4. The two half casings 3 and 5 form an annular chamber containing the driving members of the pulsator. A rotatable valve 6 is mounted in the body 1 and is supported on a projection or shoulder 7 of the body 1 enclosing the valve. The valve is a cylindrical member having two peripheral apertures 8 and 9 arranged on diametrically opposite sides and in two different planes. One of those apertures, i. e. the upper aperture 8 opens into the bore 10 disposed axially of the valve 6, while the other aperture, i. e. the aperture 9 opens into a second bore 11 arranged below and coaxially of the first bore 10. The bore 11 is open at its end 12 to atmosphere, the end being disposed in a central space 13 formed by the inner edge of the half casing 5 as illustrated in Figure 1. The bore 10 is in communication with a pipe nipple 17 which screws into a connecting piece or cover 14 mounted on and fixed by means of bolts 15 on a flange 16 of the body 1, the pipe 17 being permanently connected with the suction pipe of the milking machine. The body 1 is provided with four apertures 18, 19, 20, 21 arranged in pairs on each side of the body 1, the apertures being in communication with the chamber of manifold fixtures 22 and 23 fixed on the body 1. The fixtures are provided with connecting pieces 24 to which pipes are connected leading from the milking apparatus.

The free end of the valve 6 carries a worm wheel 25 in mesh with a worm 26 rotating in a housing 27 formed by the two half casings 3 and 5.

When the milking machine is set in motion, the valve 6 is rotated continuously by means of the worm 26 and worm wheel 25 and consequently the apertures 8 and 9 diametrically arranged at different levels register successively, the one, with the apertures 18 and 20 and the other with the apertures 19 and 21 in the body 1 of the valve.

In the first position, for instance, the aperture 8 of the rotative valve registers, as shown in Figure 1, with the aperture 18 disposed in the body 1 of the pulsator whilst the lower aperture 9 registers with the aperture 21 of the body 1. In consequence, the sucking, which exerts its action in the central pipe 10 of the valve, is transmitted by the apertures 8 and 18 to the pipe connected to the connecting piece 24 arranged on that side of the apparatus.

At the same time, the pipe connected to the other connecting pipe 24 is put into communication with the open air by means of the apertures 9, 21 and the axial bore 11. The vacuum and the atmospheric pressure thus exert their influence when the valve is rotated during the entire perod in which the apertures 8 and 9 register with the apertures 18 and 21 of the body 1. As those apertures extend over a relatively great portion of the periphery of the valve, both operations take place without jerks during a determined period. When the valve 6, on account of its rotation, has closed the aperture 18 of the body 1, the aperture 8 registers with the aperture 20 which is diametrically opposite to the aperture 18, so that the suction is then exerted through the other connecting piece 24 because the latter is put in communication with the axial bore 10. At that moment, the aperture 9 registers with the aperture 19 in the body 1 so that the bore corresponding to the latter aperture is put into communication with the atmosphere by the axial bore 11.

The vacuum and the atmospheric pressure thus exert alternately their action in each of the pipes connected to the connecting pieces 24 and it is obvious that because of the arrangement of the apertures 8 and 9 on the periphery of the valve, it is made possible to give to the apertures a relatively large size and because of the permanent communication of those apertures with the bores 10 and 11 of the valve, the duration of the displacement in front of the openings 19—20 and 18—21 can be increased so as to avoid jerks. Otherwise, jerks occur almost incessantly when the peripheral apertures are used only as passages or channels putting into communication apertures for the sucking or vacuum action and apertures open to the atmosphere, the said apertures being all arranged in the wall of the body of the pulsator in which the valve is rotated.

Furthermore, as the apparatus exerts its action in the two bores alternately, the vacuum in the main bore remains practically constant.

What we claim is:

1. In a pulsator for milking apparatus in combination with a body portion, two pipes connected to the said body and with two groups of milking apparatus, a valve contained in the said body, means whereby the said valve is rotated, said valve having two coaxially arranged bores, one thereof being connected with the atmosphere and the other with a suction supply and means whereby, when the valve is rotated, one of the pipes which is connected with the milking apparatus is connected to atmosphere when the other is connected to suction.

2. In a pulsator for milking apparatus in combination with a body portion having a plurality of openings, two pipes connected to the said body and with two groups of milking apparatus, a valve contained in the said body, means whereby the valve is rotated, said valve having two coaxially arranged bores, one thereof being connected with the atmosphere and the other with a suction supply, said valve having two peripheral apertures arranged diametrically opposite each other in two different transversal planes and disposed to register with two apertures of the body to establish communication between the coaxial bores and the body, whereby, when the valve is rotated, one of the pipes which is connected with the milking apparatus is connected to atmosphere when the other is connected to suction.

3. In a pulsator for milking apparatus, in combination a body, two pipes connected with the milking apparatus, the said body being provided with four apertures placed on diametrically opposite sides and communicating by pairs with the said pipes, a valve contained in the said body, means whereby the valve is rotated, the said valve being provided on its periphery with two apertures arranged diametrically opposite each other in two different transversal planes and disposed to register with the said apertures in the body, said valve having two coaxially arranged bores, one of which is connected with the open air and the other, with a suction supply, each of the peripheral apertures in the said valve being in permanent communication with one of the coaxial bores disposed in the axis of the valve whereby the said milking apparatus are alternately put into communication with the atmosphere and with the suction supply.

4. In a pulsator for milking apparatus, in combination a body, two pipes connected with the milking apparatus, the said body being provided with four apertures communicating in pairs with the said pipes, a valve contained in the said body, a casing formed by the said body, controlling means arranged in the said casing whereby the said valve is rotated, the said valve being provided on its periphery with two apertures arranged diametrically opposite each other in two different transversal planes and disposed to register with the said apertures in the body, said valves having two coaxially arranged bores, one of which is connected with the open air and the other with a suction supply, each of the peripheral apertures in the said valve being in permanent communication with one of the coaxial bores disposed in the axis of the valve whereby the said milking apparatus are alternately put into communication with the atmosphere and with the suction supply.

JULES PERSOONS.
ALPHONSE PERSOONS.